United States Patent [19]

Fosse

[11] Patent Number: 4,738,294

[45] Date of Patent: Apr. 19, 1988

[54] DEVICE FOR CHANGING TUBELESS TRUCK TIRES

[76] Inventor: Clarence A. Fosse, Box 187, Rothsay, Minn. 56579

[21] Appl. No.: 919,500

[22] Filed: Oct. 16, 1986

[51] Int. Cl.$^4$ .................. B60C 25/07; B60C 25/10
[52] U.S. Cl. ................................... 157/1.22; 157/1.3; 157/14
[58] Field of Search ............... 157/1.22, 1.1, 1.17, 157/1.24, 1.3, 14, 16, 17, 19, 20, 21; 269/290, 246

[56] References Cited

U.S. PATENT DOCUMENTS

| | | | |
|---|---|---|---|
| 2,481,926 | 9/1949 | Henderson | 157/14 |
| 3,016,934 | 1/1962 | Smyser | 157/14 |
| 3,823,756 | 7/1974 | Rainey | 157/1.22 X |
| 4,133,363 | 1/1979 | Gardner | 157/21 X |

Primary Examiner—Debra Meislin
Attorney, Agent, or Firm—Herman H. Bains

[57] ABSTRACT

A device for mounting and demounting tubeless tires with respect to wheel assemblies includes a wheel support structure upon which a tubeless tire and wheel assembly is positioned. An elongate vertically disposed mounting member is releasably locked to the wheel support structure and projects vertically upwardly therefrom through the tire and wheel assembly. A wheel clamping member projects through openings in the mounting member and is urged into clamping relation with the wheel by an adjustable threaded clamping bolt. An elongate lever has a tire removing member at one end thereof, which is insertable between the tire bead and the wheel rim so that, when the lever is maintained in engaging relation with the mounting member and is moved through an arc of 360 degrees, each tire bead will be successively removed from the wheel. A tire mounting shoe is mounted on the other end of the lever and is operable to stretch and force the tire bead upon the wheel rim when the lever is moved through an arc of 360 degrees and is maintained in engaging relation with the mounting member.

6 Claims, 2 Drawing Sheets

DEVICE FOR CHANGING TUBELESS TRUCK TIRES

This invention relates to a device for mounting tubeless tires upon and removing them from truck wheels.

BACKGROUND OF THE INVENTION

Many, if not most, trucks use tubeless tires, and the removal and mounting of those tubeless tires with respect to the wheels is a difficult and tedious job. Power devices have been developed specifically for the purpose of mounting and removing tubeless tires from wheels, but such equipment is expensive and cannot be afforded by modest and small operators. Presently, there are no manually operable commercial devices available for this purpose.

SUMMARY OF THE INVENTION

It is an object of this invention to provide a novel device, of simple and inexpensive construction, for use in permitting tubeless tires to be readily mounted on and removed from truck wheels.

Another object of this invention is to provide a device, for mounting tubeless tires on truck wheels including means for clamping the wheel in fixed relation, and a lever having means thereon for simultaneously engaging the wheel and the tubeless tire bead for urging the tire into mounted relation on the wheel.

A further object of this invention is the provision of a tire mounting and demounting device which permits mounting and removal of tubeless tires from truck wheels, including a lever having a shoe mechanism at one end thereof for use in mounting the tubeless tire on the wheel and in which the lever has a spade member at the other end thereof for use in progressively removing the tubeless tire from mounted relation on the wheel.

These and other objects of the invention will be more fully defined in the following Specification.

FIGURES OF THE DRAWING

DESCRIPTION OF THE PREFERRED EMBODIMENT

Figure 1:
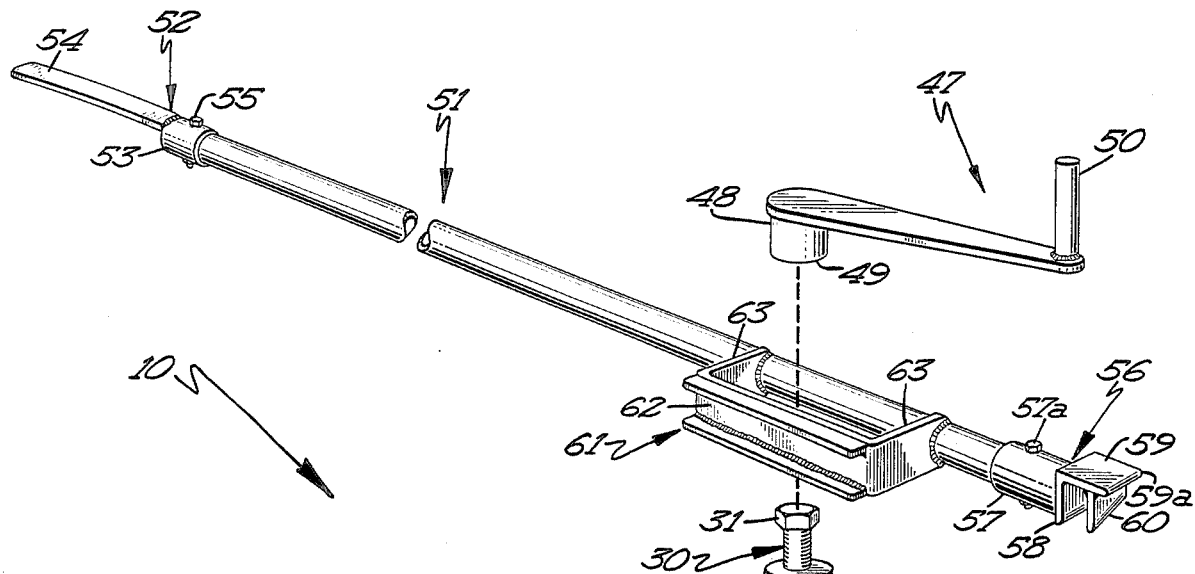
FIG. 1 is an exploded perspective view of the novel tire mounting and demounting device.
Figure 1:
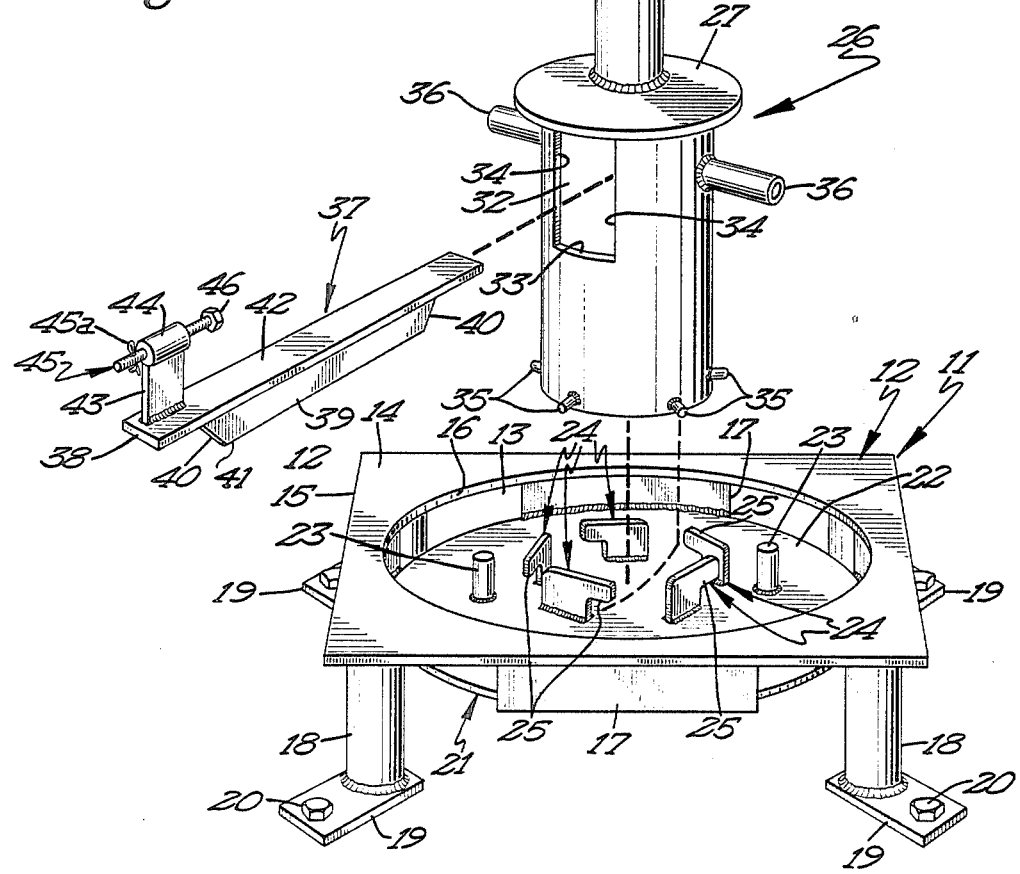
Figure 2:
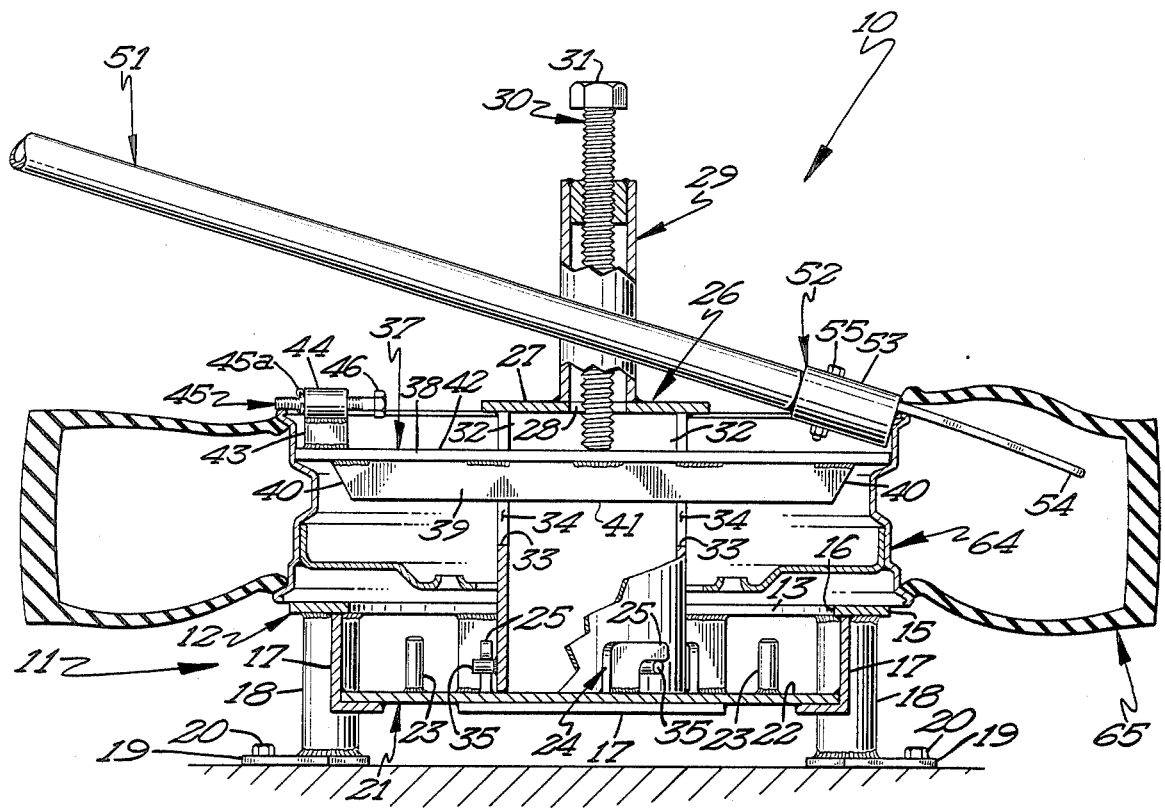
FIG. 2 is a cross-sectional view of the tire mounting and demounting device, illustrating the manner in which a tire bead is removed therefrom.
Figure 3:
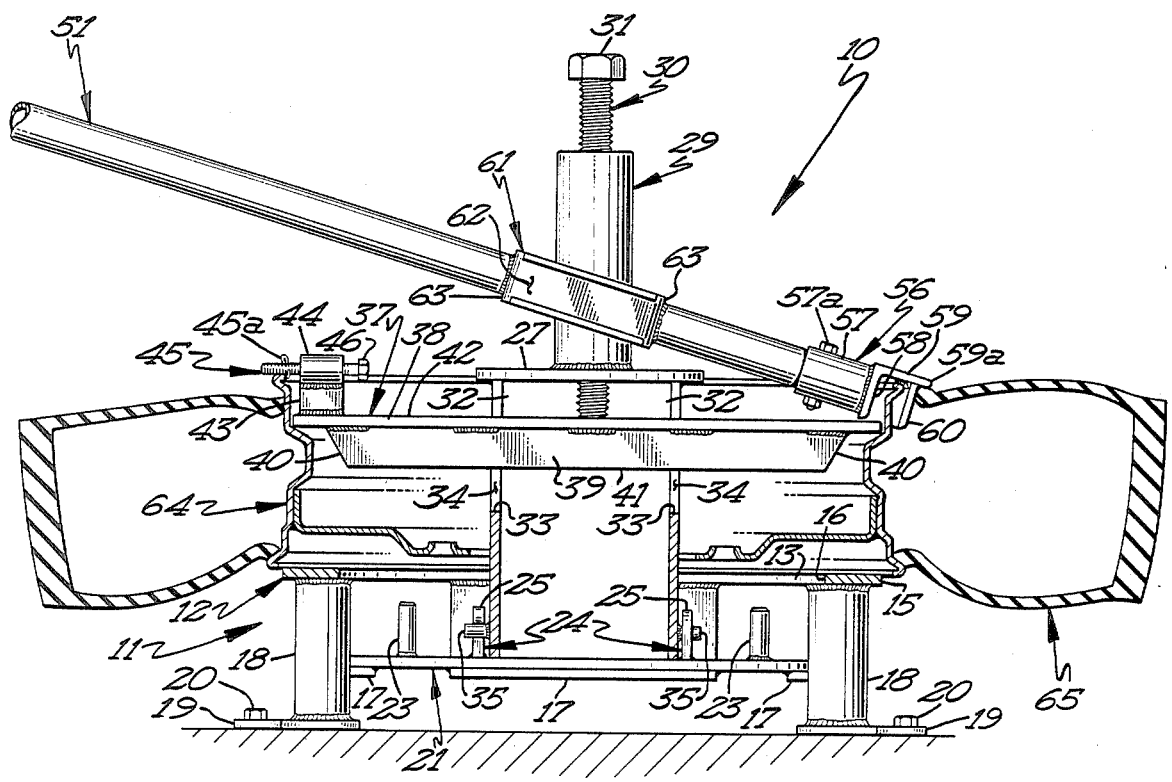
FIG. 3 is a cross-sectional view similar to FIG. 2, but illustrating the manner in which a tire is remounted on a rim.

Referring now to the drawings and, more specifically, to FIG. 1, it will be seen that one embodiment of the novel tire mounting and demounting device, designated generally by the reference numeral 10, is there-shown. The device 10 is specifically adapted for use in mounting and demounting tubeless tires from truck wheels. The tire mounting and demounting device 10 includes a wheel support structure 11, which is comprised of a flat annular wheel support platform 12 having an annular opening 13 therein. The wheel support platform 12 presents a substantially flat upper surface 14 having an outer circumferential edge 15 and an inner circumferential edge 16. A plurality of depending brackets 17 are secured to the lower surface of the wheel support platform 12 and depend therefrom.

The lower surface of the wheel support platform 12 has a plurality of tubular legs 18 rigidly affixed thereto and depending vertically therefrom. The lower ends of the legs 18 have generally rectangular substantially flat brackets 19 rigidly affixed thereto, as by welding, the brackets having openings 20 therein to permit the platform to be bolted down to a support surface.

The wheel support structure 11 also includes a substantially flat circular support plate 21, which has a diameter smaller than the diameter of the wheel support platform 12. It will be seen that the support plate 21 has a pair of positioning pins 23 rigidly affixed to the upper surface 22 thereof and projecting upwardly therefrom. In the embodiment shown, the positioning pins are disposed in opposed relation with respect to each other, but are positioned interiorly of the inner circumferential edge 16 of the wheel support platform 12.

A plurality of L-shaped locking members 24 are rigidly affixed to the upper surface 22 of the support plate and project upwardly therefrom. It will be noted that the L-shaped locking members are positioned interiorly of the positioning pins 23 and are arranged in a generally circular pattern. Each of the locking members 24 has a horizontal arm 25 which projects outwardly therefrom.

The tire mounting and demounting device 10 also includes an elongate cylindrical mounting member 26, which is provided with a circular plate 27 at its upper end. It will be noted that the upper circular plate 27 has a diameter larger than the diameter of the mounting member 26. The upper plate 27 has a centrally located opening 28 therein and the lower end of an elongate vertically disposed cylindrical guide sleeve 29 is rigidly affixed to the upper surface of the plate 27 so that the opening through the sleeve is disposed in registering relation with the opening 28 in the plate. The sleeve 29 is internally threaded for threadedly engaging an elongated clamping bolt 30, the latter having a hex-shaped head 31 at its upper end. It is pointed out that the clamping bolt 30 has a length greater than the length of the threaded sleeve 29 so that the clamping bolt 30 projects completely through the internally threaded sleeve 29 from both ends thereof.

It will be seen that the cylindrical mounting member 26 has a pair of diametrically opposed openings 32 therein, which are of generally rectangular shape, each presenting a horizontal lower edge 33 and a pair of substantially parallel vertical edges 34. The lower end portion of the mounting member 26 has a plurality of locking elements or pins 35 rigidly affixed thereto and projecting radially outwardly therefrom. The number of locking pins 35 corresponds to the number of L-shaped locking members 34 so that, when the mounting member 26 is positioned upon the support plate 21 interiorly of the L-shaped locking members 24, and thereafter rotated, the locking pins will be urged below the horizontal arm 25 of each locking member to secure the mounting member in fixed relation on the plate. In this regard, it will be noted that the locking pins are spaced slightly above the lower end of the mounting member 26 so that, when the mounting member is positioned upon the upper surface of the support plate, the locking pins will be in a position so that each will be engaged by the lower edge surface of the horizontal arm 25 when the mounting member is rotated.

Means are provided for facilitating rotation of the cylindrical mounting member 26 and, to this end, the mounting member is provided with a pair of substantially identical tubular elongate handle elements 36, each being affixed to the exterior surface of the mounting member adjacent the upper end thereof and projecting radially outwardly therefrom. It will be seen that the handle elements 36 are arranged in diametrically opposed relation with respect to each other for gripping by a user, allowing the mounting member to be readily rotated.

The tire mounting and demounting device 10 also includes a clamp member 37, which cooperates with the mounting member 26 in clamping a tire and wheel assembly on the wheel support platform. Although not shown in the drawing, each device 10 will also include a second clamping member which is slightly longer than the clamping member 37, but is otherwise identical in construction. The second clamping member will be used with a different size tire and wheel assembly.

Clamp member 37 includes an upper substantially rectangular flat plate 38 having a substantially flat vertical plate 39 rigidly affixed to the lower surface of the upper plate adjacent the center line thereof and projecting downwarly therefrom. It will be noted that the opposite ends of the vertical plate 39 are beveled downwardly and inwardly, as at 40. The lower edge 41 of the vertical plate is straight and is parallel to the upper surface 42 of the upper plate 38.

One end portion of the upper plate 38 has a vertically disposed generally rectangular shaped clamping bracket 43 affixed thereto and projecting upwardly therefrom. The upper end of the clamping bracket 43 has a horizontally disposed sleeve 44 rigidly affixed thereto, and the sleeve accommodates an elongated bolt 45 having a bolt head 46 at one end thereof. It will be noted that the length dimension of the bolt 45 is substantially greater than the sleeve 44 so that the bolt projects completely through the sleeve 44. The bolt 45 is freely movable relative to the sleeve 44 and a cotter pin or other retaining element 45a extends through an opening in the bolt to retain the latter against removal from the sleeve. The outer end of the bolt overlies the rim of the wheel and one bead of the tire.

The openings 32 in the mounting member 26 receive and accommodate a clamp member 37 so that the outer end portion of the clamping bolt 45 will overlie a wheel rim positioned upon the wheel support platform 12. The vertical plate 39 engages and rests upon the lower edge 33 of each opening 32. When the clamping bolt 30 is rotated to thread the same downwardly with respect to the sleeve 44, the lower end portion of the clamping bolt 30 will engage the upper plate 38 of the clamp member to urge the same downwardly. This downward movement of the clamp member 37 causes the clamp bolt 45 to engage the upper edge of the wheel to hold the same in clamped relation on the support platform.

Means are provided for facilitating threading of the clamping bolt 30 in a tightening or a release direction, and this means includes an elongate crank handle 47 having a socket member 48 rigidly affixed thereto adjacent one end thereof and depending therefrom. The socket member 48 has a hex-shaped socket 49 therein for accommodating the hex head of the clamping bolt 30. The crank handle 47 has an elongate hand grip member 50 affixed thereto adjacent the other end thereof and projecting therefrom in the opposite direction of the socket member 48. With this arrangement, it will be seen that, when the socket member of the crank handle 47 is applied to the hex head 31 of the clamping bolt 30, the clamping bolt 30 may be rotated either in a clamping or release direction.

Means are also provided for demounting the tire bead from the wheel rim or mounting the tire beads upon the wheel rim, and this means includes an elongate tubular lever 51 which is provided with a removal spade 52 at one end thereof. The removal spade 52 includes an elongate attachment sleeve 53 which is positioned over one end of the lever and is secured thereto by a bolt 55. The sleeve 53 has a curved spade element 54 integrally formed therewith and projecting therefrom. The spade element 54 is formed from a flat, rectangular plate having a slight curve thereto for insertion between the wheel rim and tire bead.

A shoe mechanism 56 is secured to the other end of the lever 51, and the shoe mechanism 56 includes an elongate sleeve 57, which is positioned over the end of the lever 51 and secured thereto by a bolt 57a. A rim engaging plate 58 is rigidly affixed to the outer end of the sleeve 57 and is disposed normal thereto. The rim engaging element 58 is of generally rectangular configuration and a generally rectangular shaped pressure plate 59 has one end thereof secured to one end of the rim engaging plate and projects outwardly therefrom. It will be noted that the pressure plate 59 is arranged in right angular relation with respect to the rim engaging plate 58. A generally rectangular shaped bead engaging plate 60 is rigidly affixed to the pressure plate 59 and extends in right angular relation therefrom. It will be noted that the bead engaging plate 60 is spaced from the rim engaging plate 58, but is disposed in substantially parallel relation with respect thereto. It will also be noted that the pressure plate 59 projects outwardly beyond the bead engaging plate 60 to define a lip 59a.

The lever 51 also has a U-shaped guide 61 secured thereto adjacent the one end thereof. In the embodiment shown, the U-shaped guide includes a web portion 62, which is integrally connected to a pair of legs 63, each being rigidly affixed to the lever 51. It will be noted that the U-shaped guide 61 is secured to the lever 51 adjacent that end thereof to which the shoe mechanism 56 is secured.

If a tubeless tire 65 is to be removed from a wheel 64, the tire mounted wheel will be positioned upon the wheel support platform 12 of the wheel support structure 11. It is again pointed out that the wheel support structure will be secured to the floor by bolts or the like so that it presents a very solid immovable structure. The mounting member 26 will then be positioned upon the center of the support plate 21 and the user will grip the handle elements 36 and twist the mounting member so that the locking elements 35 will be urged into locking relation with respect to the L-shaped locking members 24. The clamp member 37 will be inserted through the openings 32 in the mounting member so that the lower edge 41 of the vertical plate 39 engages the lower edge 33 defined by each opening 32.

Thereafter, the user will engage the hex head 31 with the crank handle of the clamping bolt, and the clamping bolt will be tightened downwardly so that the lower end thereof engages the clamp member to releasably lock the same in the position illustrated in FIG. 1. It will be noted that the outer ends of plate 38 will overlie wheel rim portions of the wheel rim and will prevent movement of the rim during removal of the tire from the rim.

The user will then insert the spade 52 of the lever 51 between the rim of the wheel and the tire bead. When the spade is inserted between the rim and the tire bead, the lever will extend outwardly away from the wheel support structure upon which the tire mounted wheel is supported. The user will then move the lever inwardly so that the spade 52 will have lifted a portion of the bead from the rim and so that the lever engages the vertical exterior surface of the sleeve 29. The user may then walk around the wheel support structure while holding the lever in engagement with the sleeve 29 to thereby progressively lift the bead from one side over the adjacent rim. The tire may then be pulled so that a portion of the lower bead is above the rim, while a major portion thereof is still below the upper rim. The user may then insert the spade again below the lower bead and again, using the sleeve 29 as a center, move the lever around the wheel rim through an arc of 360 degrees to completely remove the lower bead from the rim.

When a tire is remounted on the wheel rim 64, the deflated tire will be forced over the upper rim so that a portion of the lower bead has slipped below the upper rim. The user will then position the U-shaped guide 61 around the sleeve 29 and will tilt the lever so that the rim engaging plate 58 engages the inner surface of the rim of the wheel 64, and so that the bead engaging plate 60 is inserted between the tire bead and the wheel rim. It will be noted that the bolt 45 overlies the bead of the tire during the tire mounting process. This bolt 45 prevents the bead from slipping over the tire rim. The pressure plate 59 will engage the outer surface of the tire 65 adjacent the bead. A user may then move the lever through an arc of 360 degrees, thereby progressively forcing and stretching the lower bead over the wheel rim. During this movement, the pressure plate 59 will exert a downward force on the tire adjacent the bead and the bead engaging plate 60 will progressively force the tire bead over the rim.

When the lower bead has been stretched over the rim, the tire 65 will drop downwardly on the rim. Thereafter, the same procedure will be used to force the upper bead over the rim. The rim engaging plate 58 will engage the inner surface of the wheel rim and the bead engaging plate will be inserted between the rim and tire bead. The lever will again be moved through an arc of 360 degrees to completely force the upper tire bead upon the wheel rim.

From the foregoing, it will be seen that a user may readily demount a tubeless tire from a wheel with a minimum of effort and time. Further, the user may thereafter remount a tubeless tire on a wheel using a single lever in both operations. This tire mounting and demounting device is constructed of a relatively few parts and, although completely manual in operation, permits a user to quickly mount and demount tubeless tires from wheel rims.

It will, therefore, be seen that I have provided a novel tire mounting and demounting device, which is not only of simple and inexpensive construction, but one which functions in a more efficient manner than any heretofore known comparable device.

What is claimed is:

1. A device for mounting and demounting tubeless tires from wheels of tubeless tire and wheel assemblies, each tubeless tire and wheel assembly having an opening therein, comprising:
    a wheel support structure including a horizontal wheel support platform for supporting a tubeless tire and wheel assembly thereon, said wheel support structure including a support plate connected to said wheel support platform and positioned therebelow, said mounting member being positioned on said support plate and extending vertically upward therefrom,
    an elongate mounting member positioned on said wheel support structure and extending vertically upward therefrom and through the opening in the tubeless tire and wheel assembly positioned on said platform, lock engaging means on said mounting member releasably engaging cooperating locking means on said wheel support structure for releasably locking the mounting member on said wheel support structure,
    a wheel clamping member mounted on said mounting member and being supported by the latter, a clamp engaging element connected with said mounting member and being shiftable relative thereto between clamping and release positions, said clamp engaging element, when shifted to the clamping position, progressively urging said clamping member into clamping relation with the wheel of the tubeless tire and wheel assembly mounted on said platform, said clamp engaging member, when shifted to the release position, releasing the clamping member from clamped relation with the wheel,
    an elongate lever having a tire mounting shoe on one end thereof and tire removing member on the other end thereof, whereby, when the tire removing member is inserted between the wheel rim and the bead and said lever is moved through an arc of 360 degrees, one bead on one side of the tublss tire will be lifted from the wheel rim.

2. The device as defined in claim 1 wherein said tire mounting shoe includes a rim engaging member adapted to engage the wheel rim, a bead engaging member spaced from said rim engaging member and adapted to engage the bead of a tire, a pressure plate integral with said rim engaging member and said bead engaging member and projecting longitudinally from one end portion of the lever, guide means on said lever intermediate the ends thereof, whereby, when said rim engaging member engages the wheel rim, said bead engaging member engages the tire bead, said guide means engages said mounting member, and said lever is moved through an arc of 360 degrees, said pressure plate will cooperate with said bead engaging member to progressively force the tire bead upon the tire rim during movement of the lever.

3. The device as defined in claim 1 wherein said wheel support platform has a centrally located opening therein and wherein said mounting member projects upwardly through the opening in the wheel support platform and through the opening in the tire and wheel assembly positioned on said platform.

4. The device as defined in claim 1 wherein said elongate mounting member has a sleeve on the upper end thereof projecting upwardly therefrom, guide means on said lever engaging said sleeve and guiding movement of the lever when the latter is moved through an arc of 360 degrees during the mounting of a tire on a wheel rim by said tire mounting shoe.

5. A device for mounting and demounting tubeless tires from wheels of tubeless tire and wheel assemblies, each tubeless tire and wheel assembly having an opening therein, comprising:
    a wheel support structure including a horizontal wheel support platform for supporting a tubeless tire and wheel assembly thereon, an elongate mounting member positioned on said wheel support structure and extending vertically upwardly therefrom and through the opening in the tubeless tire and wheel assembly positioned on said platform, lock engaging means on said mounting member releasably engaging cooperating locking means on said wheel support structure for releasably locking the mounting member on said wheel support structure, said elongated mounting member having openings therethrough, a wheel clamping member mounted on and projecting through said openings in said mounting member and being supported by the latter, a clamp engaging element connected with said mounting member and being shiftable relative thereto between clamping and release positions, said clamp engaging element, when shifted to the clamping position, progressively urging said clamping member into clamping relation with the wheel of the tubeless tire and wheel assembly mounted on said platform, said clamp engaging member, when shifted to the release position, releasing the clamping member from clamped relation with the wheel, an elongate lever having a tire mounting shoe on one end thereof and tire removing member on the other end thereof, whereby, when the tire removing member is inserted between the wheel rim and the bead and said lever is moved through an arc of 360 degrees, one bead on one side of the tubeless tire will be lifted from the wheel rim.

6. A device for mounting and demounting tubeless tires from wheels of tubeless tire and wheel assemblies, each tubeless tire and wheel assembly having an opening therein, comprising:

a wheel support structure including a horizontal wheel support platform for supporting a tubeless tire and wheel assembly thereon, said wheel support structure including a support plate connected to said wheel support platform and spaced therebelow, an elongate mounting member positioned on said wheel support structure and extending vertically upwardly therefrom and through the opening in the tubeless tire and wheel assembly positioned on said platform, lock engaging means on said mounting member releasably engaging cooperating locking means on said support plate for releasably locking the mounting member on said wheel support structure, a wheel clamping member mounted on said mounting member and being supported by the latter, a clamp engaging element connected with said mounting member and being shiftable relative thereto between clamping and release positions, said clamp engaging element, when shifted to the clamping position, progressively urging said clamping member into clamping relation with the wheel of the tubeless tire and wheel assembly mounted on said platform, said clamp engaging member, when shifted to the release position, releasing the clamping member from clamped relation with the wheel, an elongate lever having a tire mounting shoe on one end thereof and tire removing member on the other end thereof, whereby, when the tire removing member is inserted between the wheel rim and the bead and said lever is moved through an arc of 360 degrees, one bead on one side of the tubeless tire will be lifted from the wheel rim.

* * * * *